Jan. 10, 1928.
A. H. STOKES
1,655,579
BUMPER BAR FOR VEHICLES
Filed Sept. 23, 1926
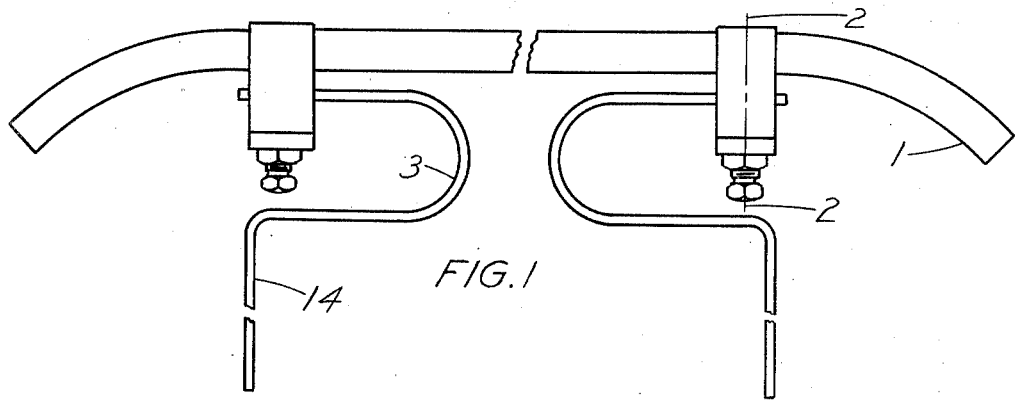
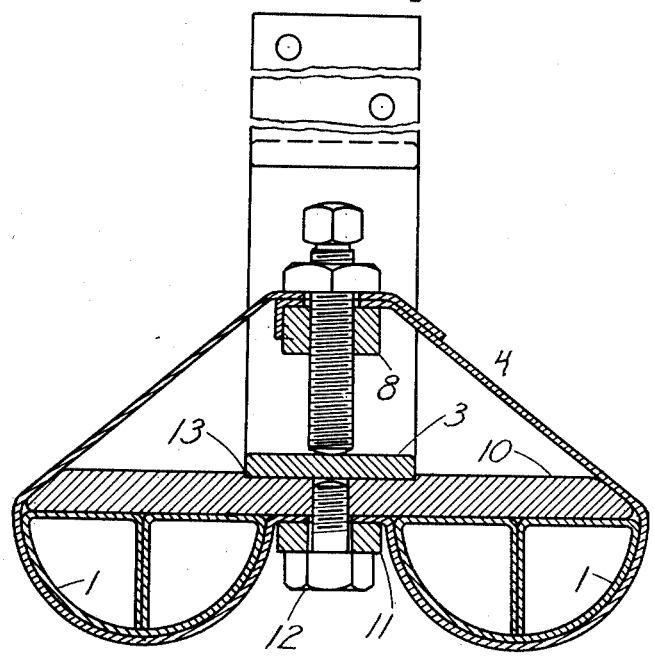
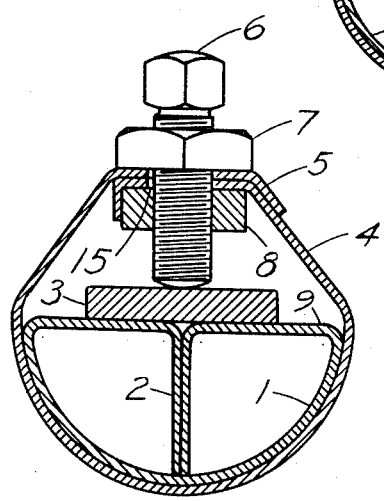
INVENTOR.
Arthur H. Stokes
BY Clark C. Wood
ATTORNEY.

Patented Jan. 10, 1928.

1,655,579

UNITED STATES PATENT OFFICE.

ARTHUR H. STOKES, OF OWOSSO, MICHIGAN.

BUMPER BAR FOR VEHICLES.

Application filed September 23, 1926. Serial No. 137,189.

My invention relates to bumpers for automobiles and similar vehicles and its purposes are to make a device in which the bumper bars shall be extremely stiff without great weight and which can be readily replaced, if necessary, without the destruction of the bumper bar itself.

I attain these purposes by the means shown in the accompanying drawings, in which Fig. 1 is a plan view of my device ready to be attached to the vehicle. Fig. 2 is a cross section of a double bumper on the line 2—2 of Fig. 1. Fig. 3 is a cross section of a single bumper on the same line.

Referring more particularly to the drawings, 1 is the bumper bar itself, which is constructed with a cross section of the form shown in Figs. 2 and 3. It is formed of a single piece of metal, bent, as shown in the drawings, into a semi-cylindrical form and the edges then bent inward, as shown at 9, until they meet, then radially outward, as shown at 2, until they come in contact with the inner circumference of the bar. By this means it is evident that an extremely light and rigid bar is formed, well adapted to sustain a severe shock without serious injury.

The bars are secured to the vehicle by U shaped springs 3, provided at one extremity with an extension 14, adapted to be attached to the frame of the vehicle. The spring 3 and the bar 1 are secured together by a strap 4 which, in the form shown in Fig. 3, extends entirely around the bar and spring and has its edges overlapping as shown at 5. A hole 15 is made through the overlapping ends of the strap 4, and a screw 6, provided with inner and outer nuts 7 and 8 holds the ends of the strap rigidly but releasably in position. The screw 6 passes on through the nut 8 and abuts against the spring 3 pressing it firmly against the turned in portions 9 of the bar 1, which is prevented from yielding by the radial parts 2, thus holding the bar and spring firmly but releasably together.

The double bar construction is illustrated in Figure 2. In this construction the strip 4 extends, as shown in the drawing, clear around both the bars. A cross-bar 10 is provided of substantially the same width as the width of the strip 4 and the bars which are mounted on the outside of this strip are kept separate from each other by a short cross-bar 11. A slight notch 13 is formed in the bar 10 to retain the spring 3 in position. The remainder of the construction is the same as in Figure 3.

In case of accident the spring 3 will first receive the shock and in most cases will absorb it before serious injury will result to the bar itself. The bar being extremely stiff will sustain a severe shock without injury.

I claim—

1. A bumper bar, substantially semi-cylindrical in cross section, composed of a single strip of metal and provided with a radially extending support.

2. A bumper bar, semi-cylindrical in cross section, composed of a single strip of metal and provided with an integrally formed, radially extending support.

3. A bumper bar, semi-cylindrical in cross section, composed of a single strip of metal, provided with an integrally formed, radially extending support and means for attaching said bumper bar to a vehicle.

4. A bumper for vehicles comprising a bumper bar, semi-cylindrical in cross section, composed of a single strip of metal, and provided with an integrally formed, radially extending support and means for attaching said bumper bar to a vehicle, said means comprising a spring, a strap surrounding said bar, and a screw for releasably locking said members together.

5. A hollow metallic bumper bar provided with a longitudinally-extending substantially positioned internal brace.

6. A hollow bumper bar provided with an integrally formed, internal brace.

7. A hollow, sheet metal, bumper bar provided with an integrally formed, internal brace.

ARTHUR H. STOKES.